United States Patent
Desai et al.

(10) Patent No.: US 11,356,923 B2
(45) Date of Patent: Jun. 7, 2022

(54) CLIENT PRE-ASSOCIATION DENIAL BASED ON SERVICE POLICY

(71) Applicant: Cisco Technology, Inc., San Jose, CA (US)

(72) Inventors: Vishal S. Desai, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/812,459

(22) Filed: Mar. 9, 2020

(65) Prior Publication Data
US 2021/0282069 A1    Sep. 9, 2021

(51) Int. Cl.
| | |
|---|---|
| *H04L 69/28* | (2022.01) |
| *H04W 40/24* | (2009.01) |
| *H04L 41/0816* | (2022.01) |
| *H04W 88/08* | (2009.01) |
| *H04W 48/16* | (2009.01) |
| *H04L 101/622* | (2022.01) |
| *H04L 41/12* | (2022.01) |
| *H04W 48/06* | (2009.01) |
| *H04L 9/40* | (2022.01) |

(52) U.S. Cl.
CPC ....... *H04W 40/246* (2013.01); *H04L 41/0816* (2013.01); *H04L 41/12* (2013.01); *H04L 61/6022* (2013.01); *H04L 63/0876* (2013.01); *H04L 69/28* (2013.01); *H04W 48/06* (2013.01); *H04W 48/16* (2013.01); *H04W 88/08* (2013.01)

(58) Field of Classification Search
CPC ... H04W 40/246; H04W 88/08; H04W 48/16; H04W 48/06; H04L 69/28; H04L 41/0816; H04L 41/12; H04L 61/6022; H04L 63/0876
See application file for complete search history.

(56) References Cited

U.S. PATENT DOCUMENTS

| | | |
|---|---|---|
| 8,854,966 B2 | 10/2014 | Fadell |
| 9,565,194 B2 | 2/2017 | Nair et al. |
| (Continued) | | |

FOREIGN PATENT DOCUMENTS

| | | |
|---|---|---|
| AU | 2013237709 A1 | 5/2014 |
| CN | 101946472 A | 1/2011 |
| (Continued) | | |

*Primary Examiner* — Lakeram Jangbahadur
(74) *Attorney, Agent, or Firm* — Patterson + Sheridan, LLP

(57) ABSTRACT

Techniques for selective association and denial of association are provided. Association requests from a first device and a second device are received at an access point. A first media access control (MAC) address of the first device is determined, and a second MAC address of the second device is determined. A first role of the first device and a second role of the second device are each identified, based on a predefined mapping between MAC addresses and roles. Upon determining that the first device is associated with the first role, a unicast response is returned to the first device, where the unicast response includes an association disallowed frame. Additionally, upon determining that the second device is associated with the second role, a unicast response is returned to the second device, where the unicast response allows the second device to associate with the access point.

16 Claims, 6 Drawing Sheets

(56) References Cited

U.S. PATENT DOCUMENTS

| | | | |
|---|---|---|---|
| 10,057,770 B2 | 8/2018 | Soundararajan | |
| 10,187,369 B2 | 1/2019 | Caldera et al. | |
| 2009/0180430 A1* | 7/2009 | Fadell | H04L 47/10 |
| | | | 370/329 |
| 2014/0317676 A1 | 10/2014 | Nair et al. | |
| 2017/0078198 A1* | 3/2017 | Nellikar | H04L 41/12 |
| 2018/0035292 A1* | 2/2018 | Soundararajan | H04L 67/303 |
| 2019/0037595 A1* | 1/2019 | Cherian | H04W 74/08 |

FOREIGN PATENT DOCUMENTS

| | | |
|---|---|---|
| CN | 104796355 A | 7/2015 |
| EP | 2232794 A2 | 9/2010 |
| EP | 2945332 A1 | 11/2015 |
| JP | 2014086083 A | 5/2014 |
| KR | 20100113558 A | 10/2010 |
| KR | 20140051067 A | 4/2014 |
| KR | 20150035980 A | 4/2015 |
| KR | 20160023746 A | 3/2016 |
| WO | 2009089051 A2 | 7/2009 |
| WO | 2019023662 A1 | 1/2019 |

\* cited by examiner

CLIENT PRE-ASSOCIATION DENIAL BASED ON SERVICE POLICY

TECHNICAL FIELD

Embodiments presented in this disclosure generally relate to networking. More specifically, embodiments disclosed herein relate to association denial based on service policies.

BACKGROUND

A large variety of enterprises, such as coffee shops, retail stores, and the like increasingly provide some network connectivity to users (e.g., guests and/or customers). For example, many entities offer guest WiFi services to their customers indoor and/or outside of their premises. Although such Internet connectivity can provide additional value for the business, it also represents additional risk and cost. For example, non-authorized individuals (e.g., non-customers) may freely connect, or overstay allowed connectivity. Some prior solutions include shutting down the access point(s) APs when the enterprise is closed, password-protecting the network, and the like. These solutions are insufficient and inflexible. Additionally, in existing systems, when association requests are denied, the client devices typically continue to transmit probes and association requests, despite the denial. This adds significant overhead and reduces the performance of the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
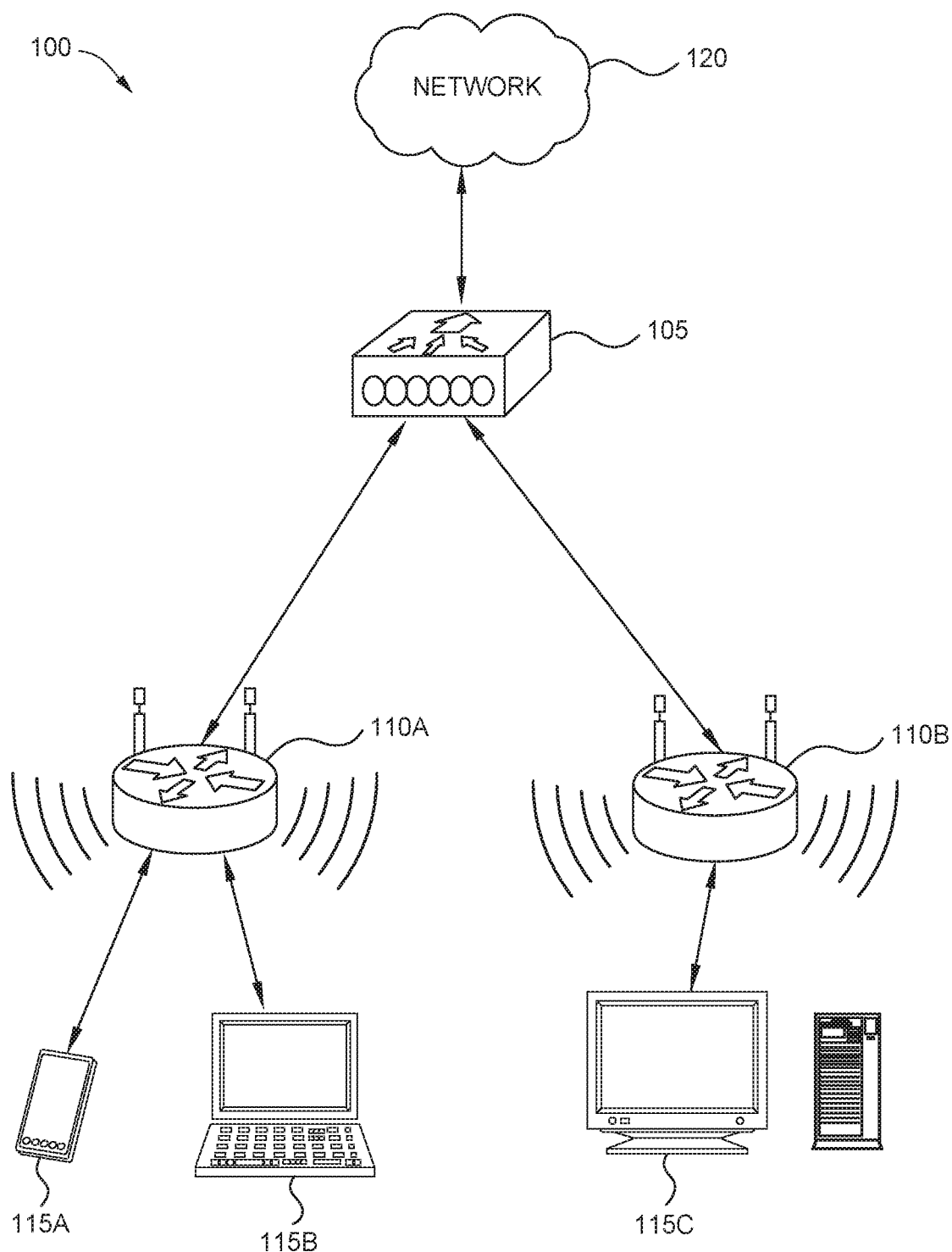
FIG. 1 depicts a system configured to improve networks by utilizing intelligent pre-association denial, according to one embodiment disclosed herein.

One embodiment presented in this disclosure a method is provided. The method includes receiving, at an access point, association requests from a first device and a second device. The method further includes determining a first media access control (MAC) address of the first device, and determining a second MAC address of the second device. Additionally, the method includes identifying a first role of the first device and a second role of the second device, based on a predefined mapping between MAC addresses and roles. Upon determining that the first device is associated with the first role, the method includes returning a unicast response to the first device, wherein the unicast response includes an association disallowed frame. Further, upon determining that the second device is associated with the second role, the method includes returning a unicast response to the second device, wherein the unicast response allows the second device to associate with the access point.

Another embodiment presented in this disclosure is a non-transitory computer-readable storage medium. The computer-readable storage medium contains computer program code that, when executed by operation of one or more computer processors, performs an operation. The operation includes receiving, at an access point, association requests from a first device and a second device. The operation further includes determining a first media access control (MAC) address of the first device, and determining a second MAC address of the second device. Additionally, the operation includes identifying a first role of the first device and a second role of the second device, based on a predefined mapping between MAC addresses and roles. Upon determining that the first device is associated with the first role, the operation includes returning a unicast response to the first device, wherein the unicast response includes an association disallowed frame. Further, upon determining that the second device is associated with the second role, the operation includes returning a unicast response to the second device, wherein the unicast response allows the second device to associate with the access point.

Another embodiment presented in this disclosure is a system. The system includes one or more computer processors, and a memory. The memory contains a program which, when executed by the one or more computer processors, performs an operation. The operation includes receiving, at an access point, association requests from a first device and a second device. The operation further includes determining a first media access control (MAC) address of the first device, and determining a second MAC address of the second device. Additionally, the operation includes identifying a first role of the first device and a second role of the second device, based on a predefined mapping between MAC addresses and roles. Upon determining that the first device is associated with the first role, the operation includes returning a unicast response to the first device, wherein the unicast response includes an association disallowed frame. Further, upon determining that the second device is associated with the second role, the operation includes returning a unicast response to the second device, wherein the unicast response allows the second device to associate with the access point.

Example Embodiments

Embodiments of the present disclosure provide techniques to selectively allow and deny association attempts based on a variety of contextual factors, including time, location, client identification, and the like. In embodiments, the system implements this dynamic "association disallowed" mechanism to allow a service set identifier (SSID) and/or basic SSID (BSSID) to accept or decline new stations based on station type, user identity, time of day, position of the station with respect to the access point (AP), the BSSID load, RF conditions, and/or business conditions (such as whether the entity is currently open to public)

This can improve access to public venue networks resources. For example, embodiments of the present disclosure can be utilized to prevent unauthorized users (e.g., non-customers) from accessing shared network resources (such as Internet connectivity). In some embodiments, Agile Multiband Operations (MBO) is used to provide an "Association Disallowed" feature, which allows an AP to deny association to specific clients via an information element (IE) 802.11 beacons, probes, and/or responses. The association disallowed attribute can be used to deny new clients from joining an already-saturated AP radio. In typical solutions, this attribute is primarily used to prevent the AP from becoming overloaded when it reaches maximum capacity (in terms of the number of stations, also referred to as client devices), or simply does not have sufficient resources to handle new clients.

In some embodiments of the present disclosure, the generic MBO Association Disallowed message is enhanced with a variety of new fields. This allows embodiments of the present disclosure to define new policies by which stations are allowed (or denied) to join a network. In some embodiments, techniques disclosed herein further limit the number of "blind-retries," such as when stations continue attempting to join a disallowed network because there are no better targets. This can waste airtime, congest the network, and exhaust the battery of the station.

In various embodiments of the present disclosure, the MBO disassociation IE is configured with an additional set of reason codes. For example, in some existing systems, the reason code can include an indication that the maximum number of stations has been reached, that the air-interface is overloaded, that the authentication server is overloaded, that there is insufficient signal strength, and the like. In some embodiments of the present disclosure, new reason codes are added to indicate an unavailability duration timer, and/or an indication that the AP cannot meet the traffic class.

In some embodiments, the unavailability duration timer is used to indicate, to the station, how long they should wait until attempting to associate with the AP again. Upon receiving such a frame, the client device can determine to delay for a relatively longer period of time (e.g., several hours) before attempting to connect again, rather than immediately retrying. In certain embodiments, the indication that the AP cannot serve the traffic class is used to indicate that the station (and/or the user of the device) does not have sufficient privilege to access the network at this time. For example, the system may be configured to prioritize certain traffic, or to restrict connectivity to only authorized devices during certain times.

In one embodiment, user priorities can be defined such that a subset of stations (e.g., identified via media access control (MAC) addresses) are prioritized over other stations. For example, devices associated with staff, security, and the like can be prioritized over unknown devices (e.g., those belonging to customers). In one aspect, such an embodiment utilizes a reasonably static association between client MAC and a given service set identifier (SSID). That is, even randomized MAC addresses can still be supported if a given MAC is always used for a given SSID. In some embodiments, during the association phase for these stations, the AP can selectively only send this IE to each station, in a unicast probe or association response. In this way, the network can selectively allow and disallow sets of stations based on their user priority/role.

In some embodiments, when an AP is loaded with set of high bandwidth stations (and beyond a configurable channel utilization (CU) occupation threshold), the AP can advertise broadcast disallow frames using 802.11 beacons, along with a specific reason code for all other stations. In embodiments, the CU is a measure of radio frequency (RF) activity on the AP channel, such as due to the AP, its clients, and/or other surrounding radio sources. In an embodiment, the threshold value can be set to different values based on the station identity and/or priority. For example, the AP can disallow guests while still allowing connectivity by employees.

In at least one embodiment, based on a variety of contextual factors (such as the time of day, a learned pattern, and the like), the maximum station capacity for each AP can be dynamically modified in order to serve a variety of needs and policies. For example, capacity can be set to zero during off-hours (e.g., times when the store is closed). In some embodiments, the received signal strength indicator (RSSI) threshold can similarly vary based on context. For example, the minimum RSSI may differ depending on whether it is currently summer and/or a terrace is open, as compared to during winter and/or when only indoor spaces are open to users). Such an embodiment enables the system to dynamically regulate the connection space.

In some embodiments, user privilege can be validated to confirm whether user device corresponds to a known entity (such as an employee, an owner, and the like) or an unknown entity (such as retail customer). This segregation can be done via separating such clients onto separate WLANs. In another embodiment, the system identifies user privilege by analyzing historical traffic trends from a set of MAC addresses at given times of the day, and/or analyze the applications they are accessing (e.g., a special preauthorized retailer application used to check their inventory). In one embodiment, detection of a privileged client (e.g. based on their MAC address) can trigger a temporal capacity change (e.g., allowing one additional device). Further, in at least one embodiment, the system utilizes other authentication methods (such as passwords) to confirm the exception. This enables the system to deny MAC impersonators.

In some embodiments of the present disclosure, neighboring APs can learn the policies and/or user-access privileges via an encrypted Neighbor Discovery Protocol (NDP). NDP can help exchange dynamic learnings of the above-referenced user-access roles. In some embodiments, NDP can further be used to propagate an entity's policies to neighboring systems, thus allowing these systems to dynamically adapt their policies to the neighbors' policies (e.g. to avoid scenarios where a malicious user abuses a given network's bandwidth, because they are blocked from accessing the neighbor's network).

In certain embodiments, session timeouts can be set by the system. In existing systems, clients send re-association requests (used as a keep alive mechanism) at regular intervals. In some deployments, the retailer may wish to grant a session time (e.g. 2 hours of free Wi-Fi). At the approximate end of the session, as the client sends the next re-association request, the next association is disallowed. In some embodiments, the AP returns an association disallowed message that includes a customized reason code/duration timer, indicating when the client should try again. For example, the message may indicate that the AP is unavailable for rest of the day.

FIG. 1 depicts a system 100 configured to improve networks by utilizing intelligent pre-association denial, according to one embodiment disclosed herein. In the illustrated system 100, a Controller 105 controls one or more APs 110A-B, which provide network connectivity to Client Devices 115A-C. In at least one embodiment, this connectivity includes access to one or more broader networks, such as Network 120, which may include the Internet. Although two APs 110A and 110B are depicted, in embodiments, any number of APs 110 may be present in a given deployment. Similarly, although three Client Devices 115A-C are depicted, in embodiments, any number of Client Devices 115A-C may be present.

The Client Devices 110A-C are generally computing devices such as mobile phones, laptops, desktops, tablets, and the like. The Client Devices 110 can generally include both personal devices (e.g., a user's telephone) as well as corporate devices (e.g., a device used by employees to complete transactions). In embodiments, the APs 110A-B are used to provide a wireless local area network (WLAN) based on configurations provided by the Controller 105. In one embodiment, the configurations can include one or more maximum capacities, indicating a number of Client Devices 115 that can be connected to each AP 110 and/or to the network overall.

In some embodiments, the capacity can be changed dynamically based on a variety of contextual factors, including the time of day, day of the month, season, whether the physical space (or portions of the space) are currently open to customers, the role of the Client Device 115 (or of the user associated with the device), and the like. That is, in one embodiment, each AP 110 (or the Controller 105) can determine whether to allow new connections based at least in part on the current context for the environment. This evaluation can be performed upon receiving an association request from a Client Device 115 (e.g., to determine what to include in the unicast response to the client) as well as in the absence of client requests (e.g., to determine what to include in multicast beacons). In some embodiments, the Controller 105 is responsible for determining whether to allow new connections. In another embodiment, each AP 110 makes this determination for itself.

In one embodiment, the system determines the current capacity of the system based at least in part on contextual policies indicating the maximum number of devices. For example, during non-business hours, the capacity may be reduced to zero (e.g., by the Controller 105). In some embodiments, the system can similarly determine other configurations, such as the minimum RSSI, based on context. For example, when only some portions of the store are open, the Controller 105 can set the minimum RSSI to a relatively higher value, so as to exclude Client Devices 115 in non-opened portions (such as outdoor patios during the winter). When those spaces are open (e.g., during warmer periods), the Controller 105 can automatically decrease the minimum RSSI to allow the APs 110 to serve Client Devices 115 in those spaces.

In at least one embodiment, the system can determine a role/identity of the Client Device 115 and/or the corresponding user, in order to determine their priority. In one such embodiment, a list of authorized or approved Client Devices 115 (e.g., specifying allowed MAC addresses) can be curated, such that these devices are allowed to connect even if others are not. For example, in some embodiments, the APs 110 can transmit unicast probes and/or association responses to the authorized Client Devices 115, even if the system is already at maximum capacity or otherwise is not accepting new client devices. In another embodiment, upon receiving an association request from a whitelisted Client device 115, the system can temporarily increase the maximum capacity by one, to make room for the device.

In one embodiment, the system determines the client's role using a predefined label, (e.g., provided by an administrator). In some embodiments, the system can infer labels based on the traffic patterns for the Client Device 115. For example, if a Client Device 115 is accessing a particular application (such as an internal application used to check inventory), the system can infer that the Client Device 115 is an authorized device used by an employee. In some embodiments, the system identifies the timing of the historical traffic for the device in order to classify it. For example, if the Client Device 115 repeatedly connects to the system at similar times each day (e.g., during the employee's shift), the system can infer that the device is authorized.

In one embodiment, if the AP 110 and/or Controller 105 determine to deny association to a Client Device 115, the AP 110 includes an association disallowed frame in the response, including an IE specifying the reason for the denial. For example, the reason may indicate that the RSSI is too low, that the AP 110 and/or WLAN network has reached maximum capacity, that the AP 110 cannot serve the particular type of client (e.g., because they are not associated with a privileged role), and the like. In some embodiments, the denial can further include an indication of a duration or delay.

In embodiments, the duration indicates how long the Client Device 115 should wait, before attempting to associate with the AP 110 again. For example, if the system utilizes daily limits (e.g., each Client Device 115 can connect for a predefined length of time per day and/or use a predefined amount of data per day) and the system determines that the Client Device 115 has exceeded this limit, the AP 110 can set the duration timer to indicate that the Client Device 115 can retry when the limit resets (e.g., the next day). In one embodiment, this includes determining an amount of time left until the reset, and utilizing this duration for the timer (e.g., indicating to try again in six hours). In another embodiment, this includes indicating a time at which the Client Device 115 should try again (e.g., indicating to try again at 12:00 AM).

In some embodiments, the system can use a predefined duration for the delay, which may be based in part on the reason for the denial. For example, denials because of poor RSSI may be associated with a first predefined delay, while denials based on capacity may be associated with a second. In at least one embodiment, the system can predict or estimate when the association will be allowed. For example, the system may learn, based on historical traffic patterns, that the number of connected devices is currently high (e.g., during a busy period for the business), but that it will drop off in the future. Based on the previous traffic, therefore, the system may estimate how long the Client Device 115 should wait, based on estimated traffic loads in the future.

In some embodiments, as discussed above, the APs 110 can utilize NDP to exchange policies and learned patterns with neighboring APs 110, in order to allow various systems to adapt to changing circumstances. For example, the AP 110A may communicate to a neighboring AP 110 (e.g., controller by a different system/Controller 105) information relating to capacity/RSSI limits at various times and dates, whitelisted devices, and the like.

Figure 2:
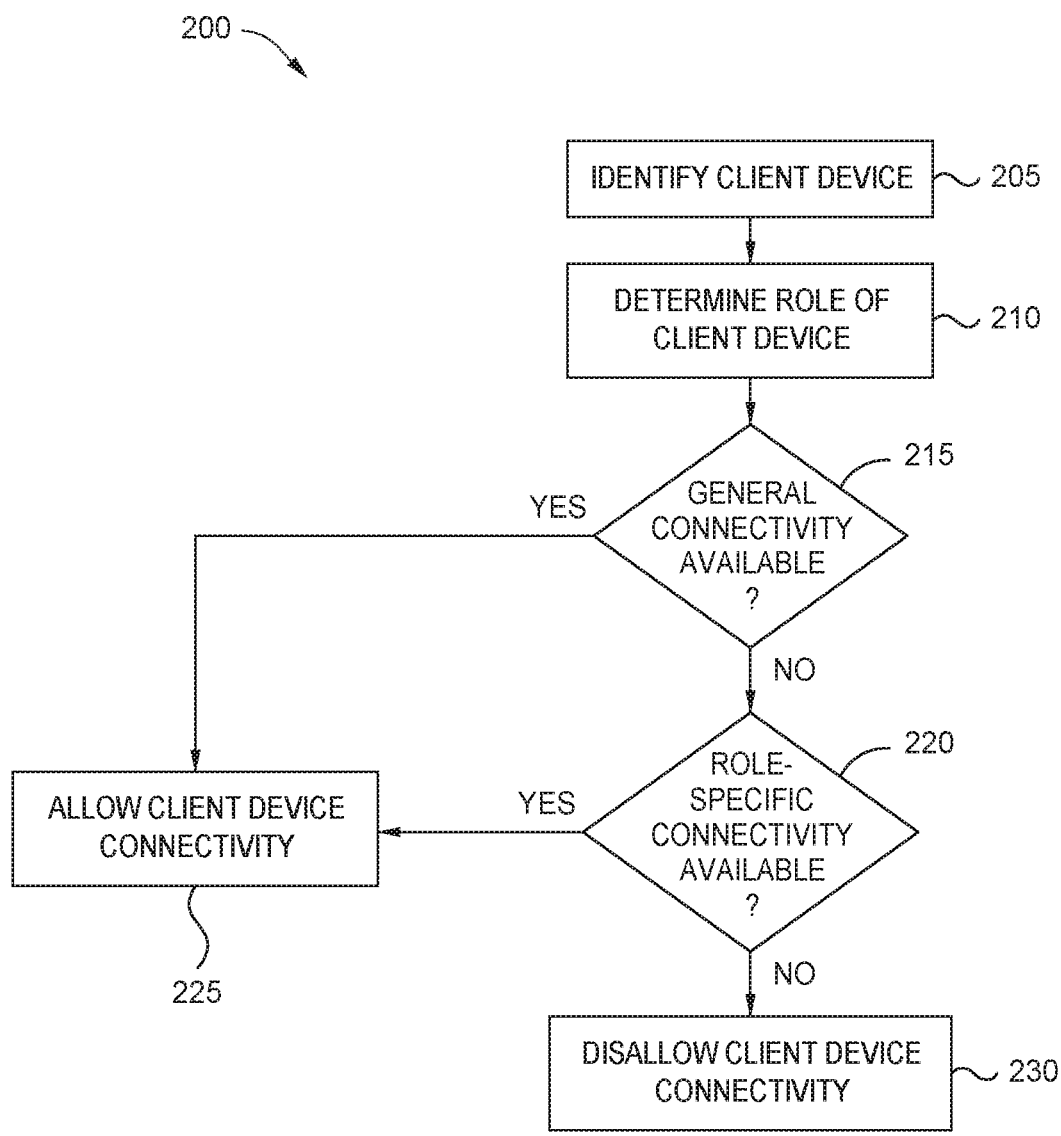
FIG. 2 is a flow diagram illustrating a method for selectively allowing and denying connectivity to improve network performance, according to one embodiment disclosed herein.

FIG. 2 is a flow diagram illustrating a method 200 for selectively allowing and denying connectivity to improve network performance, according to one embodiment disclosed herein. In one embodiment, the method 200 is performed by an AP 110. In another embodiment, the method 200 is performed by a Controller 105. In still another embodiment, the method 200 can be jointly performed by an AP 110 and Controller 105 (e.g., where some operations are performed by the AP 110 and some are performed by the Controller 105). The method 200 begins at block 205, where the system identifies a client device is connected to the AP 110, has transmitted an association request, and the like.

At block 210, the system determines the role of the client device and/or user of the device. In some embodiments, the system does so by comparing the MAC address of the device to a set of known addresses with labeled roles. For example, the device may be an employee device, a manager device, a customer device, and the like. In one embodiment, if the device is not recognized, it is classified as an unknown device (e.g., a guest or customer device). In some embodiments, the labels are provided by a user or administrator. In at least one embodiment, the system learns one or more of the labels based on traffic data for the client device(s). For example, based on the applications accessed and/or the timing of the traffic, the system can infer whether the user is privileged. In embodiments, this includes analyzing historical traffic for the device (e.g., from previous associations). In some embodiments, the system analyzes the device traffic while it is connected. When the device subsequently attempts to associate in the future, the system can evaluate the prior traffic (or retrieve the prior determinations) to determine the role of the client. In at least one embodiment, the system confirms the determined role, such as by requiring the user to authenticate using a password or other measure.

The method 200 then continues to block 215, where the system determines whether there is general connectivity available. In at least one embodiment, this includes determining the number of currently connected (to the AP 110, the system overall, or both), and comparing it to the current maximum capacity threshold. In other embodiments, the system can consider the current load on the authentication server, the available bandwidth, and the like.

If connectivity is available, the method 200 continues to block 225, where the AP 110 allows the client to connect to the network. In one embodiment, this includes transmitting a unicast message to the client device. The method 200 then terminates. Returning to block 215, if the system determines that connectivity is not currently available (e.g., because the AP 110 is already at maximum capacity), the method 200 continues to block 220.

At block 220, the system determines whether there is role-specific connectivity available. That is, the system determines whether the client device qualifies for priority or privileged access, based on the determined role. As discussed above, in some embodiments, the system can temporally increase the capacity to allow certain privileged devices to connect to the system, even while other (non-privileged) devices are denied. In various embodiments, the system may provide priority access to client devices associated with certain roles, during certain times, on certain days, and the like. For example, the system may allow security guards to connect to the network, even if customers are barred due to capacity.

If the client device qualifies for priority/privileged access, the method 200 continues to block 225, where the system allows the client to connect. In embodiments, this can include transmitting a unicast message to the client. In at least one embodiment, therefore, the AP 110 may transmit an association response allowing access to the client device, even while rejecting other devices, and/or while transmitting beacons including association disallowed frames (indicating that no devices can connect).

If such privileged access is not available, however, the method 200 continues to block 230, where the system denies the connection. In at least one embodiment, the system does so using an association disallowed response, including an IE indicating why the connection was rejected. In at least one embodiment, the response includes a duration timer indicating how long the client device should wait before attempting to associate with the AP again.

Figure 3:
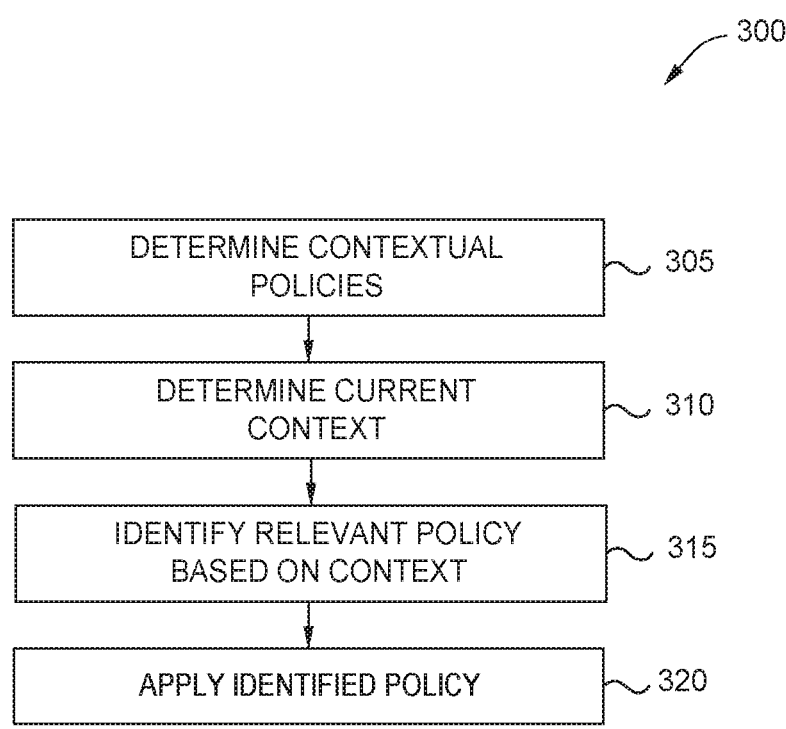
FIG. 3 is a flow diagram illustrating a method for identifying and applying policies to improve network performance using selective denial of connectivity, according to one embodiment disclosed herein.

FIG. 3 is a flow diagram illustrating a method 300 for identifying and applying policies to improve network performance using selective denial of connectivity, according to one embodiment disclosed herein. In one embodiment, the method 300 is performed by an AP 110. In another embodiment, the method 300 is performed by a Controller 105. In still another embodiment, the method 300 can be jointly performed by an AP 110 and Controller 105 (e.g., where some operations are performed by the AP 110 and some are performed by the Controller 105). The method 300 begins at block 305, where the system determines one or more contextual policies. In one embodiment, these policies are provided to the system explicitly (e.g., by a user or administrator).

In some embodiments, the system can learn some policies over time, based on traffic trends, manual configurations, and the like. In still another embodiment, at least some of the policies can be learned from neighboring APs (e.g., using NDP). In embodiments, the contextual policies generally specify an appropriate configuration or policy for the network, given a corresponding context. For example, a first contextual policy may specify the maximum capacity of one or more APs under various conditions, including time of day, day of the week, month, time of year, and the like. Continuing this example, the policies may specify a first (non-zero) maximum capacity during business hours, and a second (lower) capacity, which may be zero, during non-business hours.

As another example, the policies may specify a first minimum RSSI for some periods (e.g., during summer when the patio is open, or during business hours when customers are coming and going), with a lower RSSI for other times (e.g., during winter when the patio is closed, or during non-business hours when only employees within the premises should be on the network). Additionally, in some embodiments, the contextual policies can include relevant exceptions/privileges for authorized devices. For example, the policies may specify that client devices associated with a given role should be allowed to connect at any time, regardless of the current capacity. Similarly, a policy may indicate that certain client devices can connect after business hours, regardless of the specified capacity, but that these devices can only connect during business hours if sufficient (ordinary) capacity exists. Of course, these policies are included as non-limiting examples, and a wide variety of such policies can be implemented in various embodiments.

Once the policies have been determined, the method 300 continues to block 310, where the system determines the current context of the deployment. In embodiments, this can include determining the current time of day, date, month, season, workload, and the like. In at least one embodiment, this includes determining the role or identity of the client device and/or user that is currently requesting access. The method 300 then proceeds to block 315, where the system identifies one or more relevant policies, based on the current context. At block 320, the system then applies the determined relevant policies.

In this way, manual effort is reduced and the operability of the network is greatly improved. For example, rather than require that employees shut down or otherwise reconfigure the network at the end of each day (and reverse these changes at the start of business the next), the system can automatically make these changes when needed. Further, because the contextual policies allow for certain privileges and exceptions, authorized devices can continue to use the network normally, even if all other devices are barred.

Figure 4:
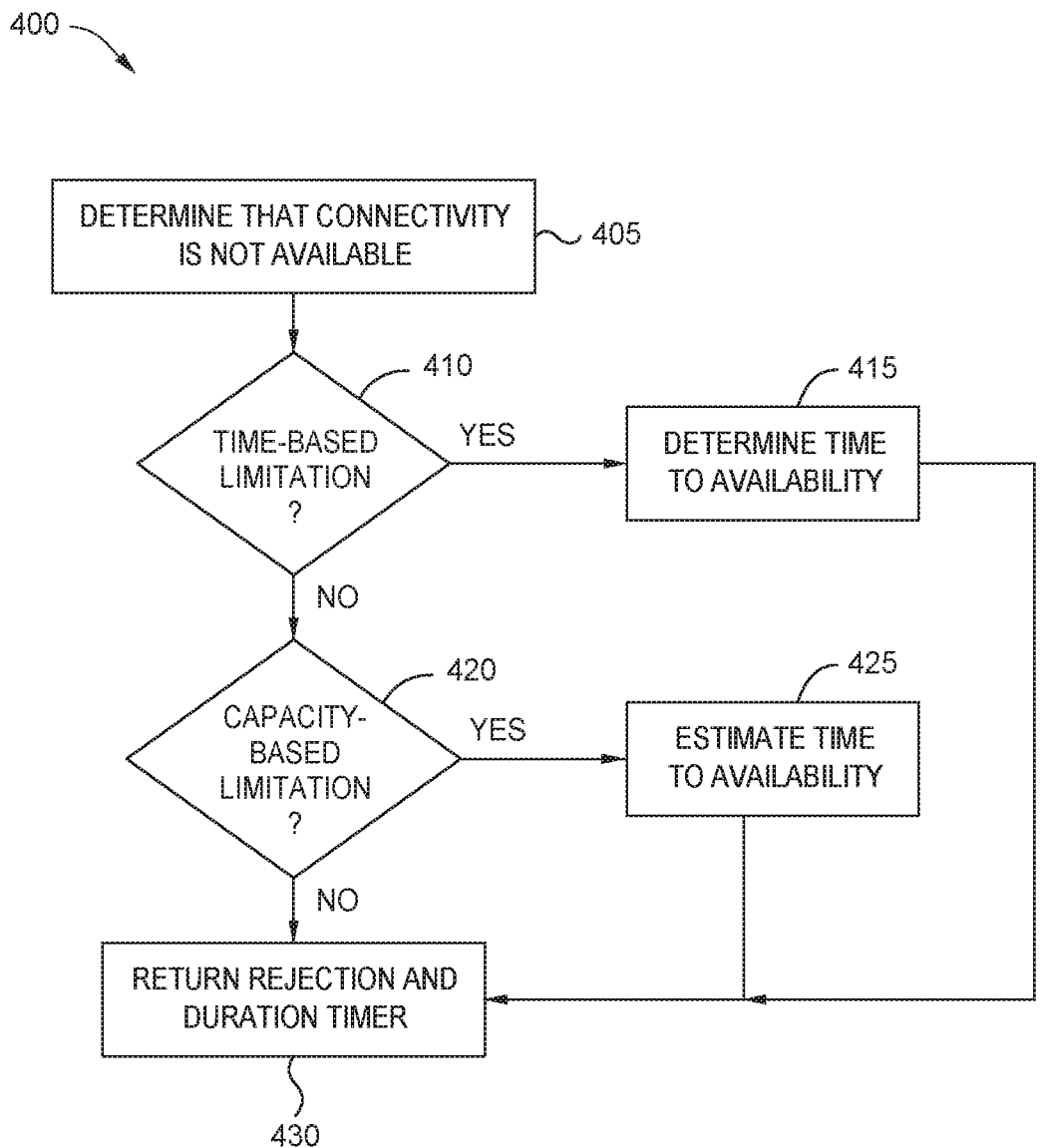
FIG. 4 is a flow diagram illustrating a method for providing improved service denial rejections to reduce network congestion, according to one embodiment disclosed herein.

FIG. 4 is a flow diagram illustrating a method 400 for providing improved service denial rejections to reduce network congestion, according to one embodiment disclosed herein. In one embodiment, the method 400 is performed by an AP 110. In another embodiment, the method 400 is performed by a Controller 105. In still another embodiment, the method 400 can be jointly performed by an AP 110 and Controller 105 (e.g., where some operations are performed by the AP 110 and some are performed by the Controller 105). The method 400 begins at block 405, when the system determines that connectivity is not available for at least one client device.

In one embodiment, this corresponds to block(s) 215 and/or 220, discussed above with reference to FIG. 2. At block 410, the system determines whether connectivity is not available due to a time-based limitation or restriction. For example, if users are limited to a predefined amount of time, bandwidth, or other service in a given period (e.g., hourly, daily, weekly, and the like). If so, the method 400 continues to block 415, where the system determines how much time remains until the availability resets or is restored. For example, if the limits reset at midnight, the system can determine how much time remains until midnight. The method 400 then continues to block 430.

Returning to block 410, if the restriction is not time-based, the method 400 continues to block 420. At block 420, the system determines whether the association denial is capacity-based. For example, if the AP and/or system is currently at its maximum capacity. If so, the method 400 continues to block 425, where the system estimates how much time remains until the system is expected to have sufficient capacity for the device.

In one embodiment, this includes analyzing historical traffic trends to predict the future traffic at one or more points in the future. In such an embodiment, the system can estimate when the number of connected devices will fall below the capacity. In at least one embodiment, the system can further consider whether any configuration changes are expected. For example, suppose another policy indicating a higher capacity will be applied at some point in the future, based on the future context. In such an embodiment, the system can estimate how much time remains until that policy is applicable. After estimating a future time, the method 400 continues to block 430.

Returning to block 420, if the system determines that the restriction is not capacity-based, the method 400 continues to block 430. In at least one embodiment, the system uses a predefined duration timer, if no other alternative is available (e.g., if no future availability can be determined based on predicted workloads and/or limitation resets). At block 430, the system returns a rejection to the client device, along with an indication of the duration timer. This indicates when the client device should attempt the connection again. In at least one embodiment, this rejection includes an association disallowed message.

Figure 5:
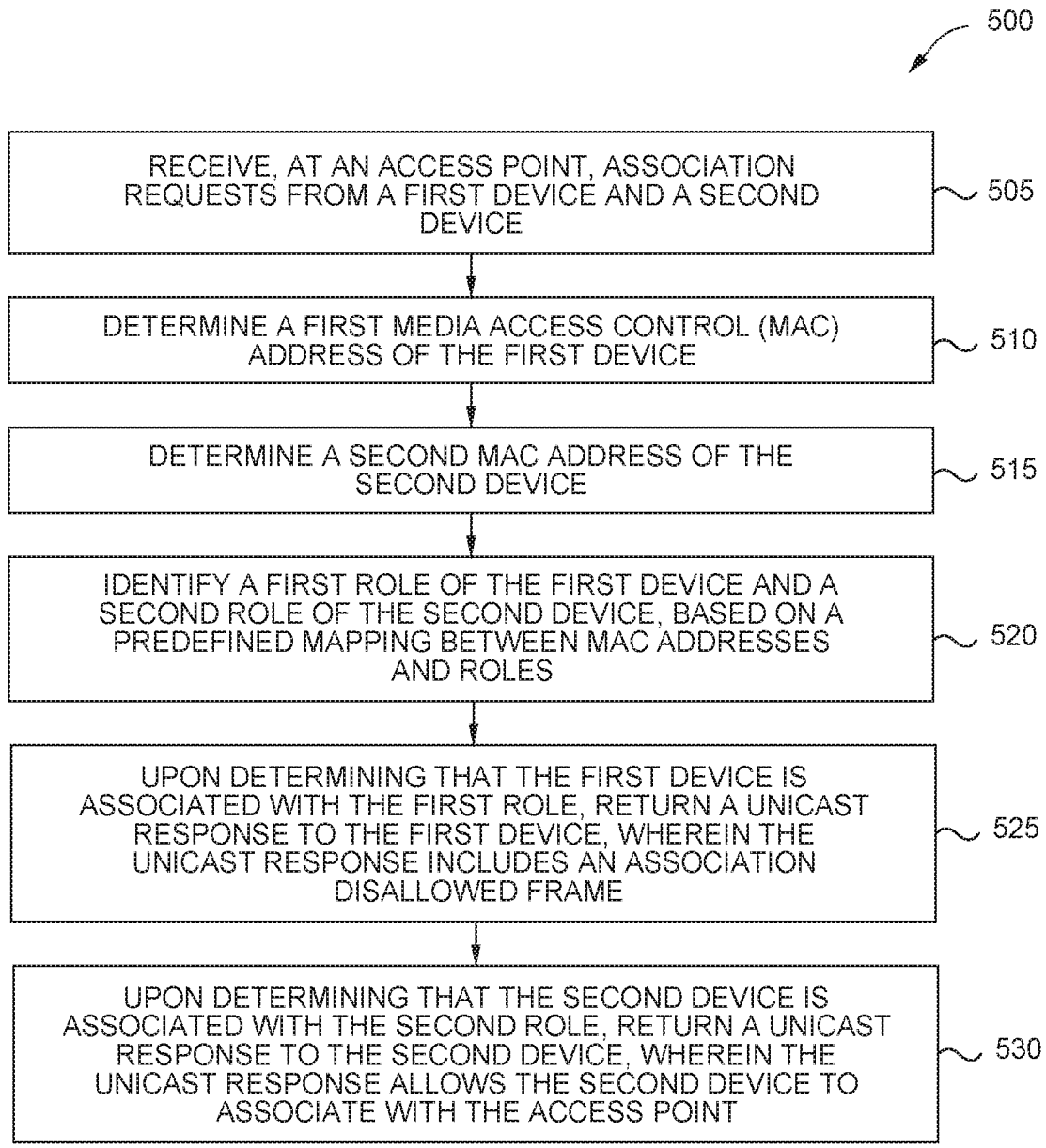
FIG. 5 is a flow diagram illustrating a method for selectively denying client associations, according to one embodiment disclosed herein.

FIG. 5 is a flow diagram illustrating a method 500 for selectively denying client associations, according to one embodiment disclosed herein. In one embodiment, the method 500 is performed by an AP 110. In another embodiment, the method 500 is performed by a Controller 105. In still another embodiment, the method 500 can be jointly performed by an AP 110 and Controller 105 (e.g., where some operations are performed by the AP 110 and some are performed by the Controller 105).

The method 500 begins at block 505, where the system receives, at an access point, association requests from a first device and a second device. At block 510, the system determines a first media access control (MAC) address of the first device. Similarly, at block 515, the system determines a second MAC address of the second device. The method 500 then continues to block 520, where the system identifies a first role of the first device and a second role of the second device, based on a predefined mapping between MAC addresses and roles. At block 525, upon determining that the first device is associated with the first role, the system returns a unicast response to the first device, wherein the unicast response includes an association disallowed frame. Additionally, at block 530, upon determining that the second device is associated with the second role, the system returns a unicast response to the second device, wherein the unicast response allows the second device to associate with the access point.

Figure 6:
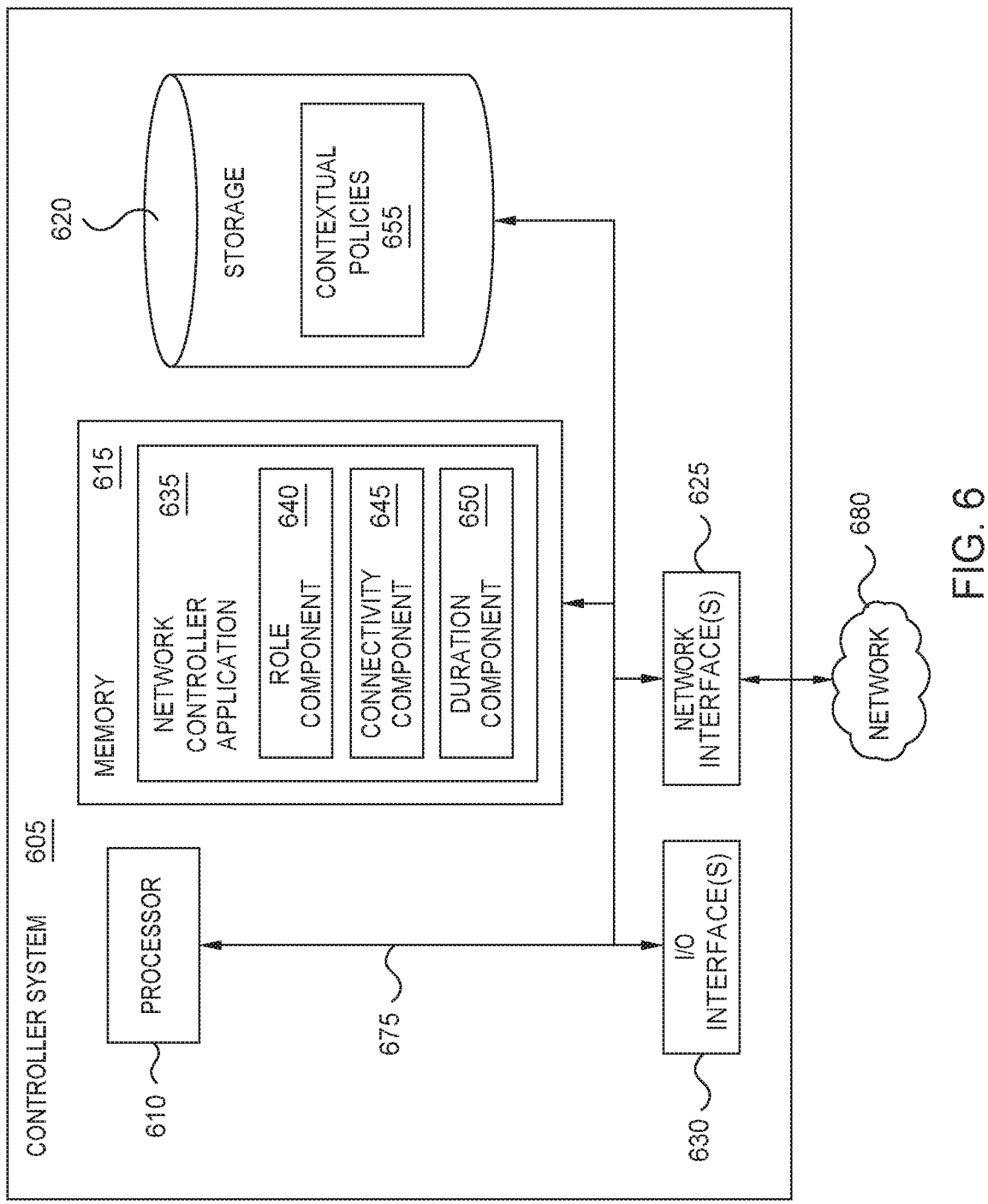
FIG. 6 is a block diagram illustrating a controller system configured to selectively enforce policies to improve network performance, according to one embodiment disclosed herein.

FIG. 6 is a block diagram illustrating a Controller System 605 configured to selectively enforce policies to improve network performance, according to one embodiment disclosed herein. In one embodiment, the Controller System 605 corresponds to an AP 110. In another embodiment, the Controller System 605 corresponds to a Controller 105. In still another embodiment, the Controller System 605 can correspond to both an AP 110 and Controller 105 (e.g., where some operations are performed by the AP 110 and some are performed by the Controller 105).

Although depicted as a physical device, in embodiments, the Controller System 605 may implemented as a virtual device or service, and/or across a number of devices (e.g., in a cloud environment). As illustrated, the Controller System 605 includes a Processor 610, Memory 615, Storage 620, a Network Interface 625, and one or more I/O Interfaces 630. In the illustrated embodiment, the Processor 610 retrieves and executes programming instructions stored in Memory 615, as well as stores and retrieves application data residing in Storage 620. The Processor 610 is generally representative of a single CPU and/or GPU, multiple CPUs and/or GPUs, a single CPU and/or GPU having multiple processing cores, and the like. The Memory 615 is generally included to be representative of a random access memory. Storage 620 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 630. Further, via the Network Interface 625, the Controller System 605 can be communicatively coupled with one or more other devices and components (e.g., via the Network 680, which may include the Internet, local network(s), and the like). Additionally, the Network 680 may include wired connections, wireless connections, or a combination of wired and wireless connections. As illustrated, the Processor 610, Memory 615, Storage 620, Network Interface(s) 625, and I/O Interface(s) 630 are communicatively coupled by one or more Buses 675.

In the illustrated embodiment, the Storage 620 includes a set of Contextual Policies 655. As discussed above, the Contextual Policies 655 generally indicate the configurations for the network (e.g., capacity, minimum RSSI, and the like) given a corresponding context (e.g., time of day, time of year, and the like). These policies can be explicitly defined by a user, learned, and the like. The Memory 615 includes a Network Controller Application 635. Although depicted as software residing in Memory 615, in embodiments, the functionality of the Network Controller Application 635 can be implemented using hardware, software, or a combination of hardware and software. In the illustrated embodiment, the Network Controller Application 635 includes a Role Component 640, a Connectivity Component 645, and a Duration Component 650. Although depicted as discrete components for conceptual clarity, in embodiments, the operations of the Role Component 640, Connectivity Component 645, and Duration Component 650 can be combined or distributed across any number of components.

In embodiments, the Role Component 640 generally identifies client devices and determines the corresponding role based on a variety of factors. In at least one embodiment, the Role Component 640 does so by first determining the MAC address of the device. In an embodiment, the Role Component 640 uses a predefined label associated with determined MAC address to determine the role. In one embodiment, the Role Component 640 analyzes the historic traffic patterns, which can include the timing and/or type of traffic, to classify the device. For example, if the device accesses a proprietary application, the Role Component 640 can infer that the device is an authorized or privileged device.

The Connectivity Component 645 generally evaluates the Contextual Policies 655 in view of the current context and/or the determined role of the client, in order to determine whether association should be allowed. If so, the Connectivity Component 645 can simply respond to the client and allow access. If not, however, the Connectivity Component 645 can deny access. In embodiments, depending on the particular privileges and policies, the Connectivity Component 645 may allow some clients to connect (e.g., using unicast frames), while disallowing others (e.g., using multicast or unicast frames). In some embodiments, the denial includes an association disallowed frame, as discussed above.

In the illustrated embodiment, the Duration Component 650 generally determines how long the client should delay before re-attempting to connect, if the association was denied. In one embodiment, if the association was denied based on the capacity of the AP, the Duration Component 650 can determine or predict when the sufficient capacity will be available (e.g., based on historical trends or future policies). For example, if the Duration Component 650 predicts that the current load will subside after the lunch rush, the Duration Component 650 may estimate a time when that will occur. Similarly, if a client attempts to connect past business hours (when no devices, or only employee devices, are permitted to connect), the Duration Component 650 may specify the time at which the store will re-open. As another example, if association was denied based on the user exceeding their allotted time and/or bandwidth, the Duration Component 650 can determine how much time remains until the limit resets. In this way, client devices can refrain from repeatedly transmitting fruitless requests that will simply be denied again.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, at an access point, association requests from a first device and a second device;
   determining a first media access control (MAC) address of the first device;
   determining a second MAC address of the second device;
   identifying a first role of the first device and a second role of the second device, based at least in part on a predefined mapping between MAC addresses and roles, and wherein identifying the second role of the second device is based at least in part on historical traffic data for the second device, wherein the historical traffic data is related to a first application on a predefined whitelist of applications;
   upon determining that the first device is associated with the first role, returning a unicast response to the first device, wherein the unicast response includes an association disallowed frame;
   determining that the access point is at full capacity; and
   upon determining that the second device is associated with the second role, returning a unicast response to the second device, wherein the unicast response allows the second device to associate with the access point, despite the determination that the access point is at full capacity, based on the historical traffic data for the second device.

2. The method of claim 1, the method further comprising:
   broadcasting, by the access point, a beacon including an association disallowed frame;
   receiving an association request from a third device, wherein the third device is associated with the second role; and
   allowing the third device to associate with the access point, despite the association disallowed frame included in the beacon.

3. The method of claim 1, the method further comprising:
   automatically configuring the access point with a non-zero capacity during business hours; and
   automatically configuring the access point with a capacity of zero during non-business hours, such that devices are prevented from associating with the access point.

4. The method of claim 1, wherein the association disallowed frame included in the unicast response to the first device comprises:
   an indication that the access point will not serve the first device, based on the first role of the first device.

5. The method of claim 1, wherein the association disallowed frame included in the unicast response to the first device further comprises:
   a duration timer for the association disallowed frame, instructing the first device to wait until the duration timer has expired before transmitting a new association request.

6. The method of claim 5, wherein the duration timer is based on a predefined time limit applied to devices attempting to associate with the access point.

7. The method of claim 5, wherein the duration timer is based on a predicted traffic load for the access point at one or more points in time when the predicted load falls below full capacity.

8. A non-transitory computer-readable storage medium containing computer program code that, when executed by operation of one or more computer processors, performs an operation comprising:
   receiving, at an access point, association requests from a first device and a second device;
   determining a first media access control (MAC) address of the first device;
   determining a second MAC address of the second device;
   identifying a first role of the first device and a second role of the second device, based at least in part on a predefined mapping between MAC addresses and roles, and wherein identifying the second role of the second device is based at least in part on historical traffic data for the second device, wherein the historical traffic data is related to a first application on a predefined whitelist of applications;
   upon determining that the first device is associated with the first role, returning a unicast response to the first device, wherein the unicast response includes an association disallowed frame;

determining that the access point is at full capacity; and
upon determining that the second device is associated with the second role, returning a unicast response to the second device, wherein the unicast response allows the second device to associate with the access point, despite the determination that the access point is at full capacity, based on the historical traffic data for the second device.

9. The non-transitory computer-readable storage medium of claim 8, the operation further comprising:
broadcasting, by the access point, a beacon including an association disallowed frame;
receiving an association request from a third device, wherein the third device is associated with the second role; and
allowing the third device to associate with the access point, despite the association disallowed frame included in the beacon.

10. The non-transitory computer-readable storage medium of claim 8, the operation further comprising:
automatically configuring the access point with a non-zero capacity during business hours; and
automatically configuring the access point with a capacity of zero during non-business hours, such that devices are prevented from associating with the access point.

11. The non-transitory computer-readable storage medium of claim 8, wherein the association disallowed frame included in the unicast response to the first device further comprises:
a duration timer for the association disallowed frame, instructing the first device to wait until the duration timer has expired before transmitting a new association requests.

12. The non-transitory computer-readable storage medium of claim 11, wherein the duration timer is based on a predicted traffic load for the access point at one or more points in time when the predicted load falls below full capacity.

13. A system comprising:
one or more computer processors; and
a memory containing a program which when executed by the one or more computer processors performs an operation, the operation comprising:
receiving, at an access point, association requests from a first device and a second device;
determining a first media access control (MAC) address of the first device;
determining a second MAC address of the second device;
identifying a first role of the first device and a second role of the second device, based at least in part on a predefined mapping between MAC addresses and roles, and wherein identifying the second role of the second device is based at least in part on historical traffic data for the second device, wherein the historical traffic data is related to a first application on a predefined whitelist of applications;
upon determining that the first device is associated with the first role, returning a unicast response to the first device, wherein the unicast response includes an association disallowed frame;
determining that the access point is at full capacity; and
upon determining that the second device is associated with the second role, returning a unicast response to the second device, wherein the unicast response allows the second device to associate with the access point, despite the determination that the access point is at full capacity, based on the historical traffic data for the second device.

14. The system of claim 13, the operation further comprising:
broadcasting, by the access point, a beacon including an association disallowed frame;
receiving an association request from a third device, wherein the third device is associated with the second role; and
allowing the third device to associate with the access point, despite the association disallowed frame included in the beacon.

15. The system of claim 13, the operation further comprising:
automatically configuring the access point with a non-zero capacity during business hours; and
automatically configuring the access point with a capacity of zero during non-business hours, such that devices are prevented from associating with the access point.

16. The system of claim 13, wherein the association disallowed frame included in the unicast response to the first device further comprises:
a duration timer for the association disallowed frame, instructing the first device to wait until the duration timer has expired before transmitting a new association request, wherein the duration timer is based on a predicted traffic load for the access point at one or more points in time when the predicted load falls below full capacity.

* * * * *